Dec. 15, 1925.                                    1,565,559
G. A. GILLEN
TRANSMISSION LOCK
Original Filed Jan. 25, 1922    2 Sheets-Sheet 1
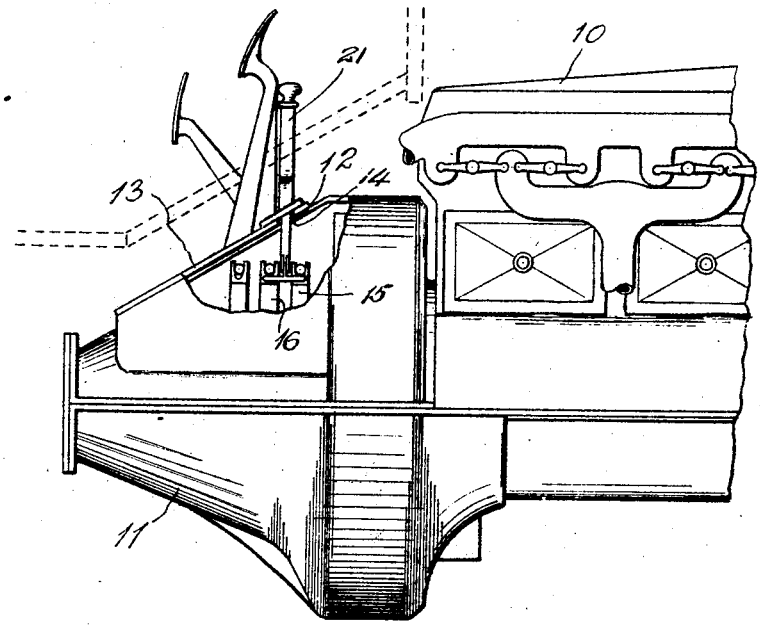
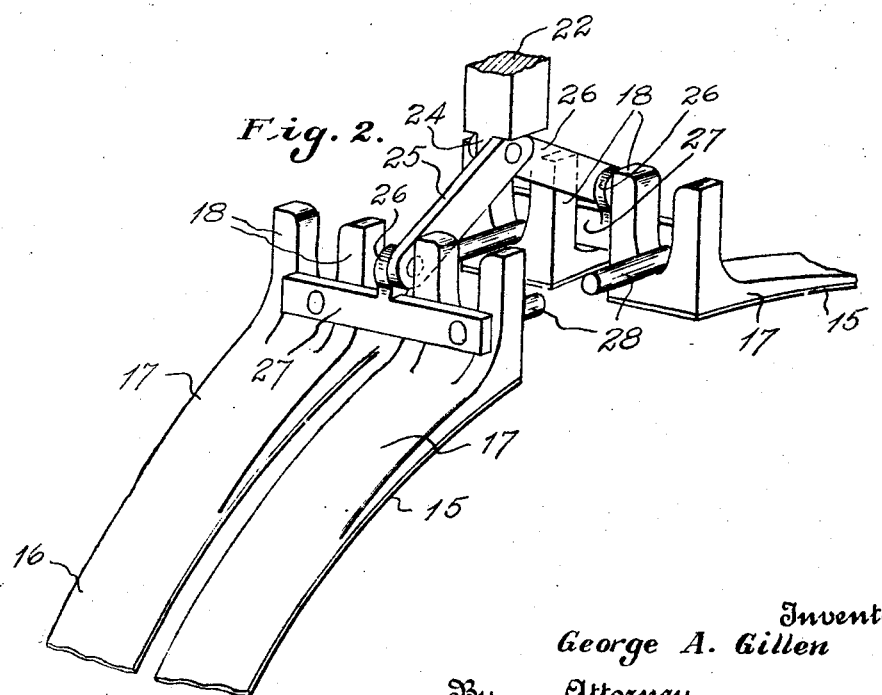
Inventor
George A. Gillen
By Attorney

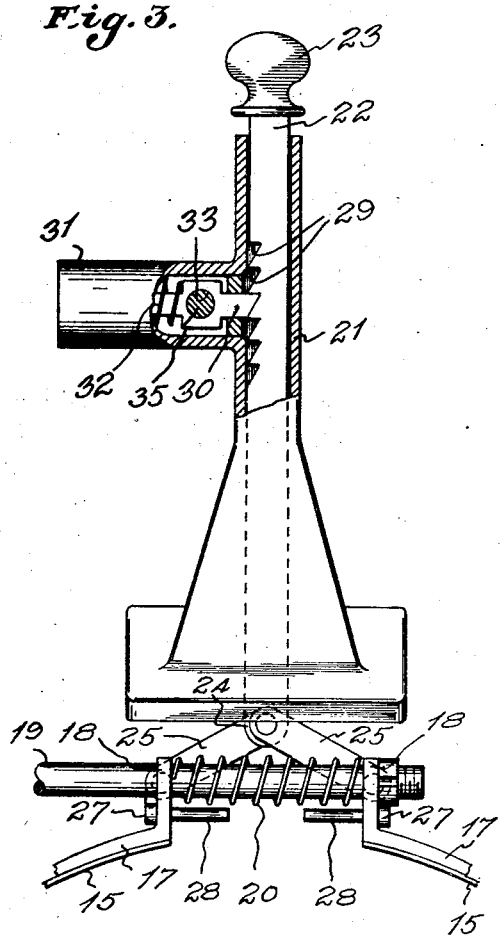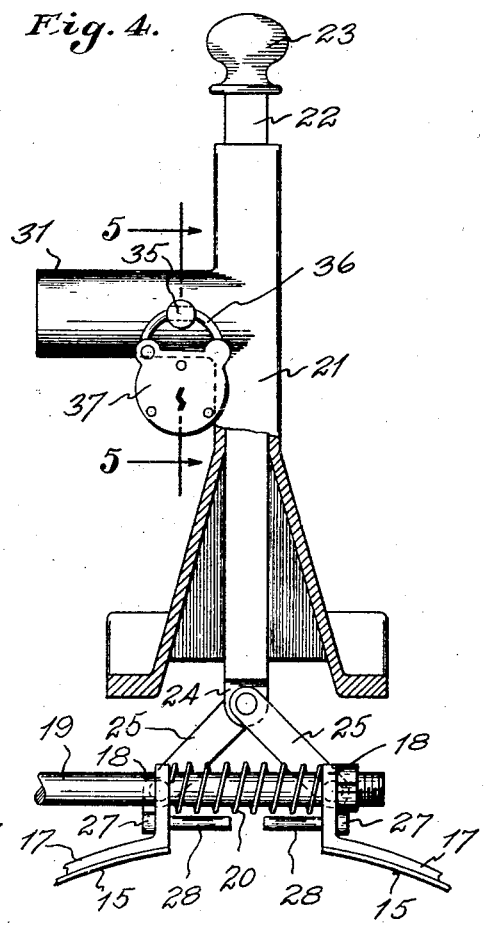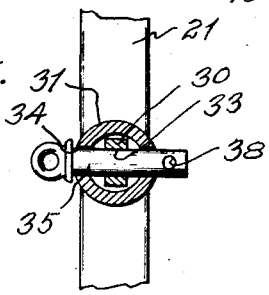

Patented Dec. 15, 1925.

1,565,559

UNITED STATES PATENT OFFICE.

GEORGE A. GILLEN, OF JERSEY CITY, NEW JERSEY, ASSIGNOR TO GILLEN LABORATORIES CORPORATION.

TRANSMISSION LOCK.

Application filed January 25, 1922, Serial No. 531,628. Renewed April 25, 1925.

*To all whom it may concern:*

Be it known that I, GEORGE A. GILLEN, a citizen of the United States, residing at Jersey City, in the county of Hudson and State of New Jersey, have invented new and useful Improvements in Transmission Locks, of which the following is a specification.

This invention relates to improvements in locking devices, and more particularly to transmission locks which are adapted to be applied to motor vehicles to prevent theft.

Another object of the invention resides in the provision of a locking mechanism which is designed to be applied to the transmission of the vehicle, and more particularly to that type of transmission known as the planetary type.

Still another object of the invention is to provide a device which tightens both the forward and reverse bands on their respective drums, thereby preventing an unauthorized person from rotating the rear wheels, it being common practice for motor thieves to support the forward end of a car on a rolling jack in order to convey the vehicle to a place of security where the locking mechanism may be manipulated or broken, and the car released.

A further object of the invention is to provide a device which may be applied to cars in present use, without changing the parts or otherwise interfering with the mechanism.

With these and other objects in view the invention consists in the novel construction, combination and arrangement of parts which will be fully set forth in the following specification, claimed and illustrated in the accompanying drawing, in which, Figure 1 is a fragmentary side view of a motor and its accompanying transmission, showing my improved locking device applied thereto, Figure 2 is a fragmentary perspective view of the forward and reverse transmission bands, illustrating my improved locking device in detail, Figure 3 is a rear view, partly in section of the locking device, showing its association with the transmission bands and cooperating mechanism, said bands being in their expanded condition and the lock unlocked, Figure 4 is a view similar to Figure 3, showing the locking device in operation and the bands contracted, and, Figure 5 is a fragmentary sectional view taken on line 5—5 of Figure 4.

Referring to the drawings in detail, the numeral 10 designates a motor provided with the customary transmission housing, 11, which is formed with the usual opening 12 in its upper side. This opening 12 is closed by a suitable cover plate 13, which is formed with an opening 14, the use of which will appear as the description proceeds. The opening 14, is located directly above the center of the space between the forward and reverse transmission bands 15 and 16 respectively, in order to admit the locking plunger, to be hereinafter more fully described, to the transmission housing. The transmission bands are provided near their adjacent ends with castings, 17, which are formed with upstanding forked members, 18, between the tines of which extend the band adjusting screws, 19.

In order to normally hold the bands expanded, compression coil springs, 20, are arranged around the screws, 19, and their ends are arranged to abut the tines of the forked members, 18, as clearly shown in Figures 3 and 4.

Secured to the cover plate 13, and extending vertically therefrom is a casing, 21, which is provided with a rectangular opening through which the locking plunger, 22, slides. This plunger extends slightly beyond the opening in the casing, and has secured thereto a knob 23, and the lower end of the plunger is provided with a depending ear 24, to which the ends of the links, 25, are pivotally connected. The opposite ends of these links are pivoted to ears, 26, formed on the equalizing bars 27, which are engaged behind the forked members 18, as will be clearly seen upon reference to the drawings. Guide pins 28, extend at right angles from the equalizing bars 27, and between the tines of the forked members 18, beneath the adjusting screws 19, previously described. It will thus be seen that as the plunger 22, is moved upwardly, the links 25, will swing on their pivots, tending to draw their lower ends closer together, thereby causing the equalizing bars 27, to move toward each other and tighten the bands around their respective drums.

In order to hold the device in lock position, the plunger, 22, is provided in one face with a plurality of notches 29, which are adapted to receive the end of a locking bolt 30, mounted in a cylidrical housing, 31, which is formed integrally with and extends laterally from the casing, 21. As illustrated, the bolt 30, is nominally urged into engagement with the notched face of the plunger 22, by means of a compression coil spring 32, and in order to prevent an unauthorized person from withdrawing the bolt, I provide said bolt with an opening 33, which when the bolt, is in projected position, registers with openings 34, formed in the casing 31. It will thus be seen that when the bolt is in projected position, a pin 35, may be inserted through the openings, and the hasp 36, of a padlock 37, may be passed through the aperture 38, formed near one end of the pin. In this way it will be evident that when the pin 35, is inserted as directed, and the padlock 37, locked with its hasp 36, extending through the opening 38, the bolt 30, cannot be withdrawn from its engagement in the notches 39, thereby preventing the loosening of the bands 15 and 16, on their respective drums. Obviously, when both the bands are tightened, the car will be locked so as to prevent either forward or rearward movement, and any attempt at theft will be frustrated.

In order to unlock the device, the padlock 37 is unlocked in the customary manner and its hasp 36 removed from its position in the opening 38 of the pin 35. The pin is then withdrawn from its position in the bolt 30, thus permitting it to be moved inwardly against the spring 32 so as to free the plunger 22 and permit it to move downwardly so as to allow for the expansion of the bars 27 and bands 15 and 16 under the influence of the springs 20. Thus it will be seen that the drums will be free to rotate within their respective bands in the ordinary manner and the car operated without difficulty.

While in the foregoing there has been shown and described the preferred embodiment of this invention, it is to be understood that certain minor changes, in the details of construction, combination and arrangement of parts may be resorted to without departing from the spirit and scope of the invention as claimed.

I claim—

1. The combination with a planetary transmission having forward and reverse bands, of a locking means associated with said transmission for tightening both the forward and reverse bands simultaneously.

2. The combination with a planetary transmission having forward and reverse bands, of a locking means associated with the bands to contract the same on their respective drums, said locking means being equalized so that the degree of tightness of both bands will be uniform.

3. The combination with a planetary transmission having forward and reverse bands, of a plunger, band contracting means connected to the plunger and adapted to tighten the bands on their respective drums when the plunger is moved upwardly.

4. The combination with a planetary transmission having forward and reverse bands, of a plunger, and equalizing band contracting means connected to the plunger and associated with the bands in such a manner that when the plunger is moved upwardly the bands will be contracted on their respective drums.

5. The combination with a planetary transmission, having forward and reverse bands, of equalizing bars, and means associated with the equalizing bars for moving the same toward each other and contracting the bands on their respective drums.

6. The combination with a planetary transmission having forward and reverse bands of equalizing bars associated with the bands, a plunger and means connecting the plunger with the bars to move the same toward each other and to tighten said drums on their respective bands.

7. The combination with a planetary transmission having forward and reverse bands, of equalizing bars associated with the bands, a vertically movable plunger, links connecting the plunger with the equalizing bars, whereby, when the plunger is moved upwardly the bands will be contracted on their respective drums, and means for locking the plunger in elevated position.

8. The combination with a planetary transmission having forward and reverse bands, of equalizing bars associated with the bands, a vertically movable plunger, links connecting the equalizing bars with the plunger whereby when the plunger is moved upwardly the bands will be contracted on their respective drums, means to hold the plunger in elevated position and guide pins carried by the bars.

9. The combination with a planetary transmission having forward and reverse bands, of a vertically movable plunger means to lock the plunger in an elevated position, links connected to the plunger, equalizing bars at the opposite ends of the links and associated with the bands so that when the plunger is moved upwardly the bands will be contracted on their respective drums, and guide pins on the bars for holding the bars in proper relation to the bands.

10. A transmission lock comprising a vertically movable plunger, means to lock the plunger in elevated position and means at the lower end of the plunger for contracting the forward and reverse bands of a planetary transmission on their respective drums.

Signed at New York in the county of New York and State of New York this 20th day of January, 1922.

GEORGE A. GILLEN.